US008924622B2

(12) United States Patent
Coronado et al.

(10) Patent No.: US 8,924,622 B2
(45) Date of Patent: Dec. 30, 2014

(54) EXTENDER STORAGE POOL SYSTEM

(71) Applicant: International Business Machines Corporation, Armonk, NY (US)

(72) Inventors: Juan A. Coronado, Tucson, AZ (US); Christina A. Lara, Tucson, AZ (US); Lisa R. Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/220,186

(22) Filed: Mar. 20, 2014

(65) Prior Publication Data

US 2014/0208028 A1 Jul. 24, 2014

Related U.S. Application Data

(63) Continuation of application No. 13/026,026, filed on Feb. 11, 2011, now Pat. No. 8,706,946.

(51) Int. Cl.
G06F 12/00 (2006.01)
G06F 11/20 (2006.01)
G06F 3/06 (2006.01)

(52) U.S. Cl.
CPC ............ G06F 3/065 (2013.01); *G06F 2201/84* (2013.01); G06F 11/2074 (2013.01); G06F 11/2069 (2013.01); G06F 3/067 (2013.01); G06F 3/0619 (2013.01)
USPC ......... 711/2; 711/118; 711/162; 711/E12.103

(58) Field of Classification Search
CPC ........ G06F 3/0619; G06F 3/065; G06F 3/067
USPC .............................................. 711/2, 118, 162
See application file for complete search history.

(56) References Cited

U.S. PATENT DOCUMENTS

| | | |
|---|---|---|
| 6,502,205 B1 | 12/2002 | Yanai et al. |
| 6,981,114 B1 | 12/2005 | Wu et al. |
| 7,039,778 B2 | 5/2006 | Yamasaki |
| 7,111,189 B1 | 9/2006 | Sicola et al. |
| 7,225,307 B2 | 5/2007 | Micka et al. |
| 7,284,150 B2 | 10/2007 | Ma et al. |
| 7,328,319 B1 | 2/2008 | Bottomley |
| 7,437,601 B1 | 10/2008 | Manley et al. |
| 7,467,329 B1 | 12/2008 | Keeton et al. |
| 7,512,835 B2 | 3/2009 | Bartfai et al. |
| 7,555,622 B2 | 6/2009 | Fujibayashi |
| 7,627,729 B2 | 12/2009 | Bartfai et al. |
| 7,890,798 B1 | 2/2011 | Priddy |
| 8,204,858 B2 | 6/2012 | Wayda et al. |
| 2004/0088508 A1 | 5/2004 | Ballard et al. |
| 2006/0031646 A1 | 2/2006 | Maruyama et al. |
| 2007/0234108 A1 | 10/2007 | Cox et al. |
| 2007/0239725 A1 | 10/2007 | Bhat et al. |
| 2009/0300315 A1 | 12/2009 | Agombar et al. |

OTHER PUBLICATIONS

Xiang et al, "Storage Virtualization Base Asynchronous Remote Mirror" pp. 313-318, IEEE, 978-0-8695-3766-05/09, 2009 Eighth International Conference on Grid and Cooperative Computing.

*Primary Examiner* — Aracelis Ruiz
(74) *Attorney, Agent, or Firm* — Griffiths & Seaton PLLC

(57) ABSTRACT

Various embodiments for managing data in a computing storage environment by a processor device are provided. In one such embodiment, by way of example only, an extender storage pool system is configured for at least one of a source and a target storage pool to expand an available storage capacity for the at least one of the source and the target storage pool. A most recent snapshot of the data is sent to the extender storage pool system. The most recent snapshot of the data is stored on the extender storage pool system as a last replicated snapshot of the data.

20 Claims, 6 Drawing Sheets

| Host | Source | | Target | |
|---|---|---|---|---|
| | Use User Interface (C storage pool. | - 212 | Use User Interface (CLI or GUI) to create storage pool. | - 214 |
| | Assign section of pool for Snapshots. | - 216 | Assign section of pool for Snapshots. | - 218 |
| | Create several LUN's in storeage pool. | - 220 | Create several LUN's in storage pool. | - 222 |
| | Use User I/F (CLI or GUI) to create the extender storage pool in the extender storage system. | - 224 | Use user I/F (CLI or GUI) to create the extender storage pool in the extender storage system. | - 226 |
| | Create asynch pair. | - 228 | | |
| | Establish asynch relationship. | - 230 | | |
| | Create new "most recent snapshot" of source volume, which will serve as baseline, in its storage pool. | - 232 | | |
| | Sync job sends source volume data to target. | - 234 | | |
| Write I/O. | Sync job completes transfer. | - 236 | Create new "last replicated snapshot" in its storage pool. | - 240 |
| | Rename "most recent snapshot" "last replicated snapshot", which represents last point in time for recovery. | - 238 | | |
| Write I/O. | | | | |
| | Time intervals expires. | - 242 | | |
| | Create new "most recent snapshot" in its storage pool. | - 244 | | |
| Write I/O. | Compare "most recent snapshot" to "last replicated snapshot", both are in the storage pool. | - 246 | | |
| | The difference is the new data that needs to be sent to target. | - 248 | | |
| Write I/O. | Sync job sends new updates to target. | - 250 | | |
| | Sync job completes transfer. | - 252 | | |
| | Delete "last replicated snapshot" from its storage pool. | - 254 | Delete "last replicated snapshot" From its storage pool. | - 256 |
| | Rename "most recent snapshot" "last replicated snapshot". | - 258 | Create new "last replicated snapshot" in its storage pool. | - 260 |
| Write I/O. | | | | |
| | Time interval expires. | - 262 | | |
| | Failure to create new "most recent snapshot" because there is no room in storage pool for the new snapshot. | - 264 | | |
| | Create the "most recent snapshot" in cache. | - 266 | | |
| Write I/O. | Compare "most recent snapshot" in cache to "last replicated snapshot", which is in its storage pool. | - 268 | | |
| | The difference is the new data that needs to be sent to target. | - 270 | | |
| Write I/O. | Sync job sends new updates to target. | - 272 | | |
| | Sync job completes transfer. | - 274 | | |
| | Delete "last replicated snapshot" from its storage pool. | - 276 | Delete "last replicated snapshot" from its Storage pool. | - 278 |
| | Rename "most recent snapshot" "last replicated snapshot", and send it to its local storage extender to be saved in the local extender storage pool. | - 280 | Create new "last replicated snapshot" in its storage pool. | - 282 |

FIG. 5

| Host | Source | | Target | |
|---|---|---|---|---|
| | | | | 300 |
| | Use User Interface (CLI or GUI) to create storage pool. | - 302 | Use User Interface (CLI or GUI) to create storage pool. | - 304 |
| | Assign section of pool for Snapshots. | - 306 | Assign section of pool for Snapshots. | - 308 |
| | Create several LUN's in storeage pool. | - 310 | Create several LUN's in storeage pool. | - 312 |
| | Use User I/F (CLI or GUI) to create the extender storage pool in the extender storage system. | - 314 | Use user I/F (CLI or GUI) to create the extender storage pool in the extender storage system. | - 316 |
| | Create asynch pair. | - 318 | | |
| | Establish asynch relationship. | - 320 | | |
| | Create new "most recent snapshot" of source volume, which will serve as baseline, in its storage pool. | - 322 | | |
| Write I/O. | Sync job sends source volume data to target. | - 324 | | |
| | Sync job completes transfer. | - 326 | Create new "last replicated snapshot" in its storage pool. | - 330 |
| | Rename "most recent snapshot" "last replicated snapshot", which represents last point in time for recovery. | - 328 | | |
| Write I/O. | | | | |
| | Time intervals expires. | - 332 | | |
| | Create new "most recent snapshot" in its storage pool. | - 334 | | |
| Write I/O. | Compare "most recent snapshot" to "last replicated snapshot", both are in the storage pool. | - 336 | | |
| | The difference is the new data that needs to be sent to target. | - 338 | | |
| Write I/O. | Sync job sends new updates to target. | - 340 | | |
| | Sync job completes transfer. | - 342 | | |
| | Delete "last replicated snapshot" from its storage pool. | - 344 | Delete "last replicated snapshot" From its storage pool. | - 346 |
| | Rename "most recent snapshot" "last replicated snapshot". | - 348 | Create new "last replicated snapshot" in its storage pool. | - 350 |
| Write I/O. | | | | |
| | Time interval expires. | - 352 | | |
| | Create new "most recent snapshot" in its storage pool. | - 354 | | |
| Write I/O. | Compare "most recent snapshot" to "last repolicated snapshot", both are in the storage pool. | - 356 | | |
| | The difference is the new data that needs to be sent to target. | - 358 | | |
| Write I/O. | Sync job sends new updates to target. | - 360 | | |
| | Sync job completes transfer. | - 362 | | |
| | Delete "last replicated snapshot" from its storage pool. | - 364 | | |
| | Rename"most recent snapshot" "last replicated snapshot". | - 366 | Delete "last replicated snapshot" From its storage pool. | - 368 |
| | | | Fail to create new "last replicated snapshot" in its storage pool because there is no room in its storage pool. | - 370 |
| | | | Send "last replicated snapshot" to its local storage extender to be saved in the local extender storage pool. | - 372 |

FIG. 6

EXTENDER STORAGE POOL SYSTEM

REFERENCE TO RELATED APPLICATION

This Application is a Continuation of U.S. patent application Ser. No. 13/026,026, now U.S. Pat. No. 8,706,946, filed on Feb. 11, 2011, the contents of which are incorporated herein by reference, in their entirety.

BACKGROUND OF THE INVENTION

1. Field of the Invention

The present invention relates in general to computers, and more particularly to apparatus, method and computer program product embodiments for managing data in a computing storage environment using an extender storage pool system.

2. Description of the Related Art

Mirroring between storage controllers may be effected in either asynchronous or synchronous mode. In asynchronous mode, the primary storage controller can confirm a write completion to the host before the write has been copied to the secondary storage controller. Asynchronous mode is a less expensive solution that has an acceptable lag between the primary and secondary copy being up to date. The acceptable time difference is defined by the storage administrator as the Recovery Point Objective (RPO). In synchronous mode, the primary storage controller copies the write operations to the secondary storage controller and does not notify the host that the write operation has completed until the secondary storage controller confirms the write operation.

SUMMARY OF THE INVENTION

As will be further described below in additional detail, in some mirroring implementations, an applicable storage pool may run out of available space to create snapshots in either the source or target system. This may result in deactivation of the mirroring, which prevents any further updates reaching the secondary storage controller until a storage administrator intervenes.

In view of the foregoing, a need exists for mechanisms facilitating data storage between mirrored entities to ensure that, for example, in a situation where available space is scarce, the data continues to be safeguarded. Accordingly, various embodiments for managing data in a computing storage environment are provided. In one such embodiment, by way of example only, an extender storage pool system is configured for at least one of a source and a target storage pool to expand an available storage capacity for at least one of the source and the target storage pool. A most recent snapshot of the data is sent to the extender storage pool system. The most recent snapshot of the data is stored on the extender storage pool system as a last replicated snapshot of the data.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 is a flow chart diagram of a first exemplary method for facilitating data storage according to one aspect of the illustrated embodiments, in which a source system has reduced or no space for a data snapshot; and FIG. 6 is a flow chart diagram of a second exemplary method for facilitating data storage according to one aspect of the illustrated embodiments, in which a target system has reduced or no space for a data snapshot.

DETAILED DESCRIPTION OF THE DRAWINGS

Figure 1:
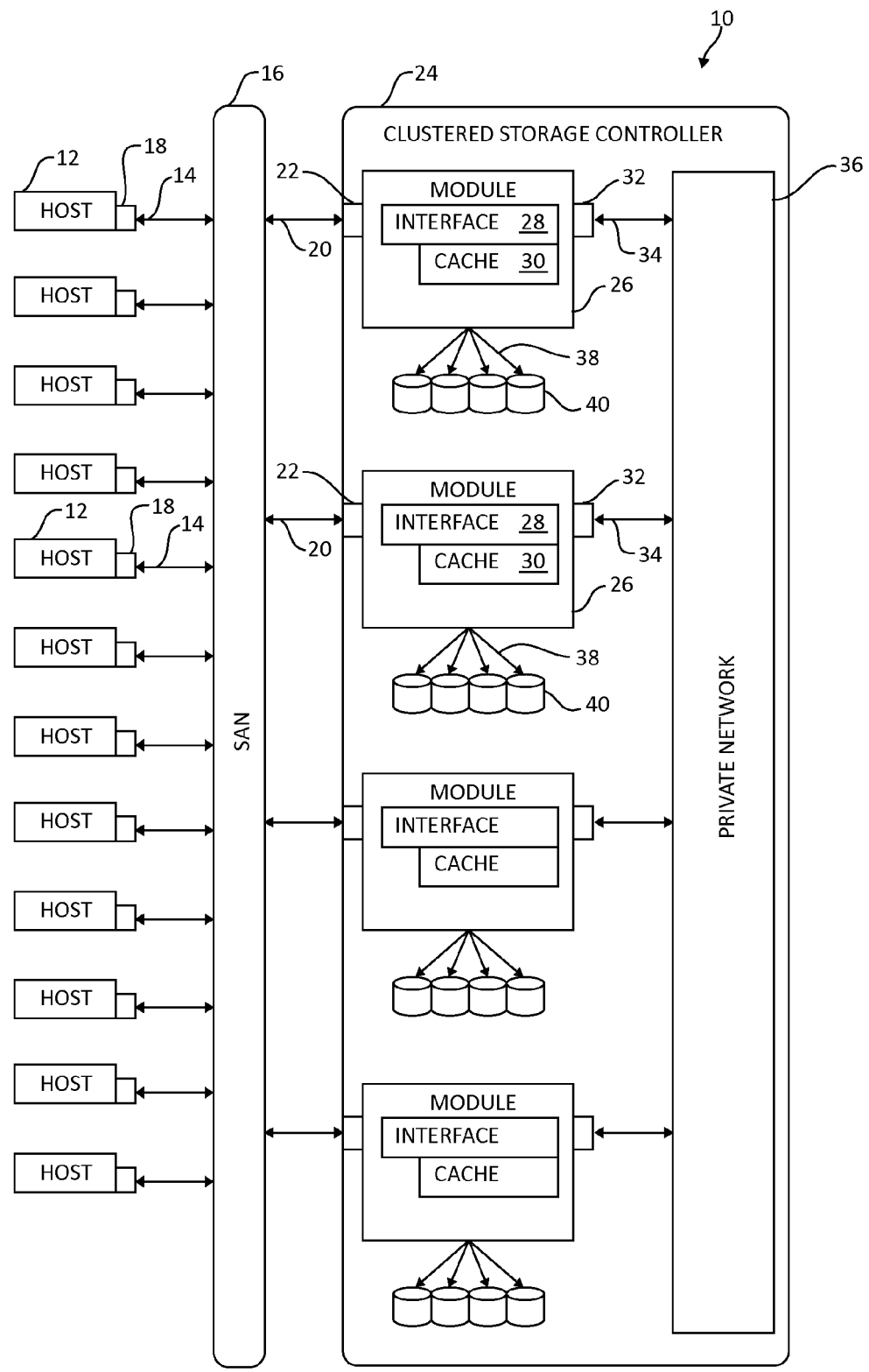
FIG. 1 is a block diagram of an exemplary computing storage environment in accordance with certain embodiments.

As previously mentioned, mirroring between storage controllers may be effected in either asynchronous or synchronous mode. In asynchronous mode, the primary storage controller can confirm a write completion to the host before the write has been copied to the secondary storage controller. Asynchronous mode is a less expensive solution that has an acceptable lag between the primary and secondary copy being up to date. The acceptable time difference is defined by the storage administrator as the Recovery Point Objective (RPO). In synchronous mode, the primary storage controller copies the write operations to the secondary storage controller and does not notify the host that the write operation has completed until the secondary storage controller confirms the write operation.

In some storage controllers, such as the IBM® XIV Storage System, implementation of asynchronous mirroring requires the creation and deletion of snapshots on the source and target systems. In XIV systems, while the asynchronous mirror is active, and at the time to synch the source and target volume, the source system contains two snapshots, and the target system contains one snapshot. The source system creates a "most recent snapshot," which keeps track of the most recent changed, updated or new data in the source system. Both the source and target systems create the "last replicated snapshot," which contains the snapshot of data replicated in both the source and target systems.

Again, in the XIV Storage System, the storage administrator uses a Graphical User Interface (GUI) or a Command Line Interface (CLI) to define the appropriate asynchronous volumes in the source and target systems, and the time interval schedule. When the time interval expires or a manual intervention is performed, the source system creates a "most recent snapshot" of the source volume. The storage space for the "most recent snapshot" is allocated from the source volume storage pool. The source system compares the "most recent snapshot" to the "last replicated snapshot," and the difference between the snapshots is the data that needs to be replicated in the target system. Once the data is replicated in the target system, the target system deletes its "last replicated snapshot," and the "last replicated snapshot" space is returned to the target storage pool. At the same time, the target creates a new "last replicated snapshot" which represents the latest replicated data. After the source system receives the completion from the target system, the source system deletes its "last replicated snapshot", and renames the "most recent snapshot" to the "last replicated snapshot". The "last replicated snapshot" represents the most recent "point in time" to which the source volume may be restored.

Below, in Table 1, is a high level description of the steps taken by the source and target systems for asynchronous mirror of a single volume pair, in one scenario:

TABLE 1

Asynchronous Mirror Operations

| Host | Source | Target |
|---|---|---|
| | Establish asynch relationship. Create new "most recent snapshot" of source volume which will serve as baseline. | |
| Write I/O. | Sync job sends source volume data to target. Sync job completes transfer. Rename "most recent snapshot" "last replicated snapshot," which represents last point in time for recovery. | Create new "last replicated snapshot". |
| Write I/O. | | |
| | Time interval expires. Create new "most recent snapshot." | |
| Write I/O. | Compare "most recent snapshot" to "last replicated snapshot." (The difference is the new data that needs to be sent to target.) | |
| Write I/O. | Sync job sends new updates to target. Sync job completes transfer. Delete "last replicated snapshot." | Delete "last replicated snapshot" |
| | Rename "most recent snapshot" replicated snapshot". | Create new "last replicated snapshot." |

As described in previous paragraph and shown in the scenario both the source and target systems allocate and delete snapshots whenever the schedule time to synch the source and target volume arrives. The snapshot space is not allocated prior to the sync job which can result in an out of space condition in the storage pool of either the source or target system. The out of space condition in either the source or target system can result in deactivation of the mirror and then cause the Disaster Recovery solution to be out of sync. The snapshot storage space is bounded by a storage pool as mirrors are defined in a storage pool, disk capacity is allocated to a storage pool and multiple storage pools can exist on a single system. Snapshots in the storage pools exist on the actual hard drive storage and are not stored in areas like cache, nonvolatile storage or virtual memory.

A reoccurring challenge with this approach is that the storage pool may run out of available space to create the snapshots in either the source or target system. Such condition may occur, for example, if there is a lot of data written to disk, if the storage allocation to the pool is not adequately planned for, and if multiple user-defined snapshots are created in the pool. This can result in deactivation of the mirroring which prevents any further updates getting to the secondary until the storage administrator intervenes.

As a result, the storage administrator will have to increase storage pool capacity to the storage pool, delete volumes in the pool to make available space, move volumes to new pools, etc, and then manually reactivate the mirroring. If this happens on the primary system, the condition is recognized and steps are taken by the software on the primary to rectify in order to free up space but at some point there may not be anything else to free up and mirroring is deactivated. If this happens on the secondary, mirroring is deactivated without any attempt to free up space.

All of the mirroring can be restarted but it may be a lengthy process which could jeopardize the recovery point objective (RPO) if it requires additional physical storage to be added, determining where space can be freed in other pools, etc. In some cases it could require stopping applications if a user cannot risk continuing without the mirroring. The process to free up space could take hours, where the user's RPO could be minutes. This puts a customer's disaster recovery solution at risk and can cause an outage if a disaster were to occur during the time the mirrors were deactivated.

The following illustrated embodiments serve as mechanisms to address the challenges previously stated. For example, in one embodiment, the mechanisms of the illustrated embodiments present a method for preventing the deactivation of an asynchronous mirror by allowing for automatic pool extension or data usage onto a secondary system as a storage extender as will be further described. In the current art, storage pool expansion is manually initiated. Accordingly, when a storage pool runs out of storage space, the storage pool must send a notification alert, and then wait for user intervention. In the meantime, any asynchronous mirroring is deactivated. The mechanisms of the illustrated embodiments serve, for example, to address this deactivation problem that may result of out of storage pool conditions in either the source, target, or both systems used for asynchronous mirroring operations.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

The storage subsystem 10 receives, from one or more host computers 12, input/output (I/O) requests, which are commands to read or write data at logical addresses on logical volumes. Any number of host computers 12 is coupled to the storage subsystem 10 by any means known in the art, for example, using a network. Herein, by way of example, the host computers 12 and the storage subsystem 10 are assumed to be coupled by a Storage Area Network (SAN) 16 incorporating data connections 14 and Host Bus Adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30.

Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30.

Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16, which can be of any known type having a digital cross-connect function. In addition, the HBAs 18 may be directly coupled to the storage modules 26 in an additional implementation.

Data having contiguous logical addresses are generally distributed among the disks 40. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

The mechanisms of the present invention provide, in one embodiment, methodologies for prevention of deactivation of an asynchronous mirror whenever the source or target system or both systems runs out of storage pool space to create a new mirror snapshot. In one embodiment, the out of storage pool condition is prevented by expanding the source or target or both system storage pool. The expanded storage pool is obtained from another local system that has been configured with an extended storage pool for the local source or target system. Throughout the following description, the local system will be referred to as the local extender storage pool system.

In one embodiment, to access its local extender storage pool system, the source or target system may be connected to the local extender storage pool system either directly or through a switch. The number of ports to be used for the connection may be the recommended number of ports when a sync mirror connection is performed.

Figure 2:
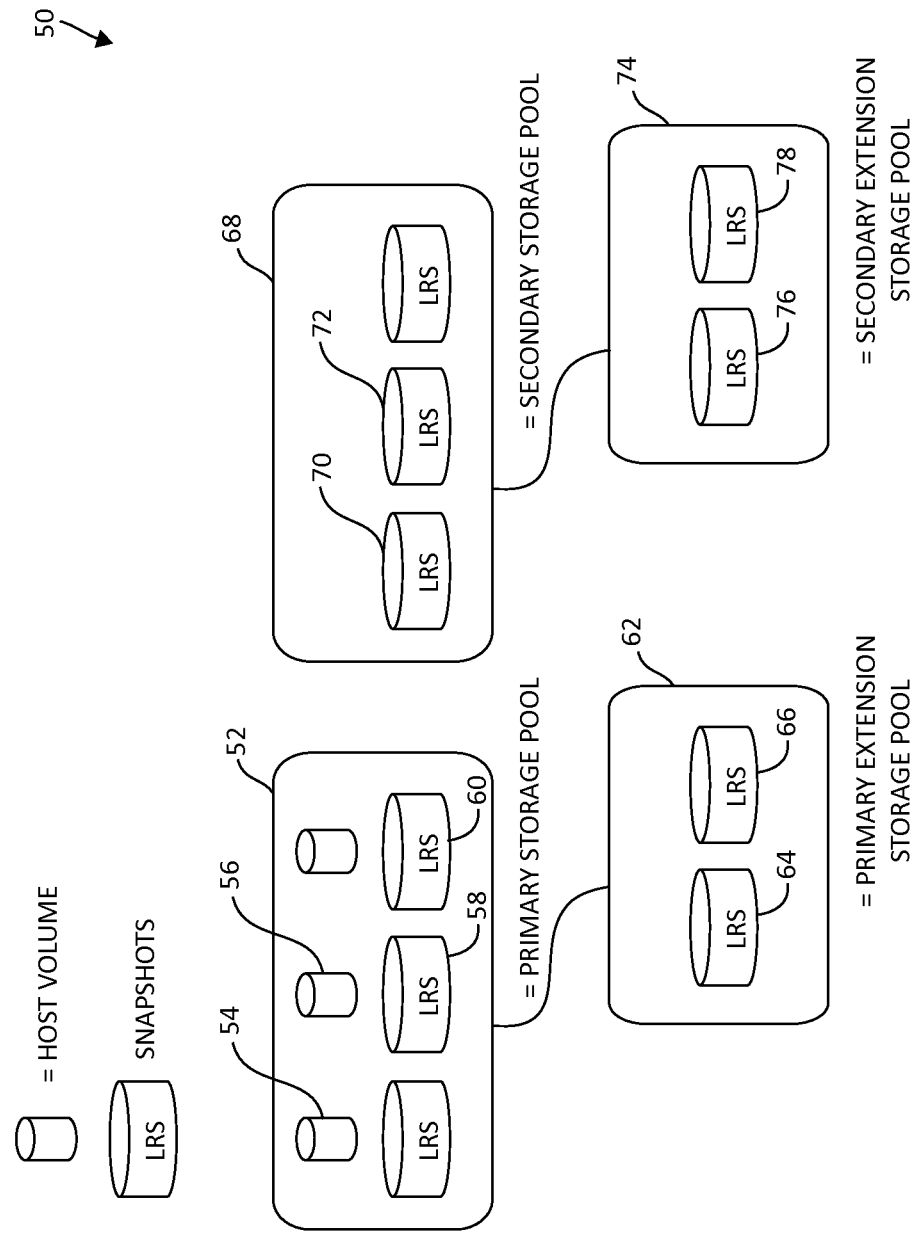
FIG. 2 is a block diagram of exemplary primary and secondary storage pools connected to associated primary and secondary extension (or extender) storage pools, in which various aspects of the present invention may be implemented.

FIG. 2, following illustrates an exemplary configuration 50 of primary and secondary storage pools connected to associated primary and secondary extension (or extender) storage pool systems. As shown, primary storage pool 52 includes host volumes 54, and 56, for example, and last replicated snapshot volumes 58 and 60. Secondary storage pool 68 includes last replicated snapshot volumes 70 and 72, for example. Secondary extension storage pool 74 includes last replicated snapshot volumes 76 and 78, for example, as shown.

Figure 3:
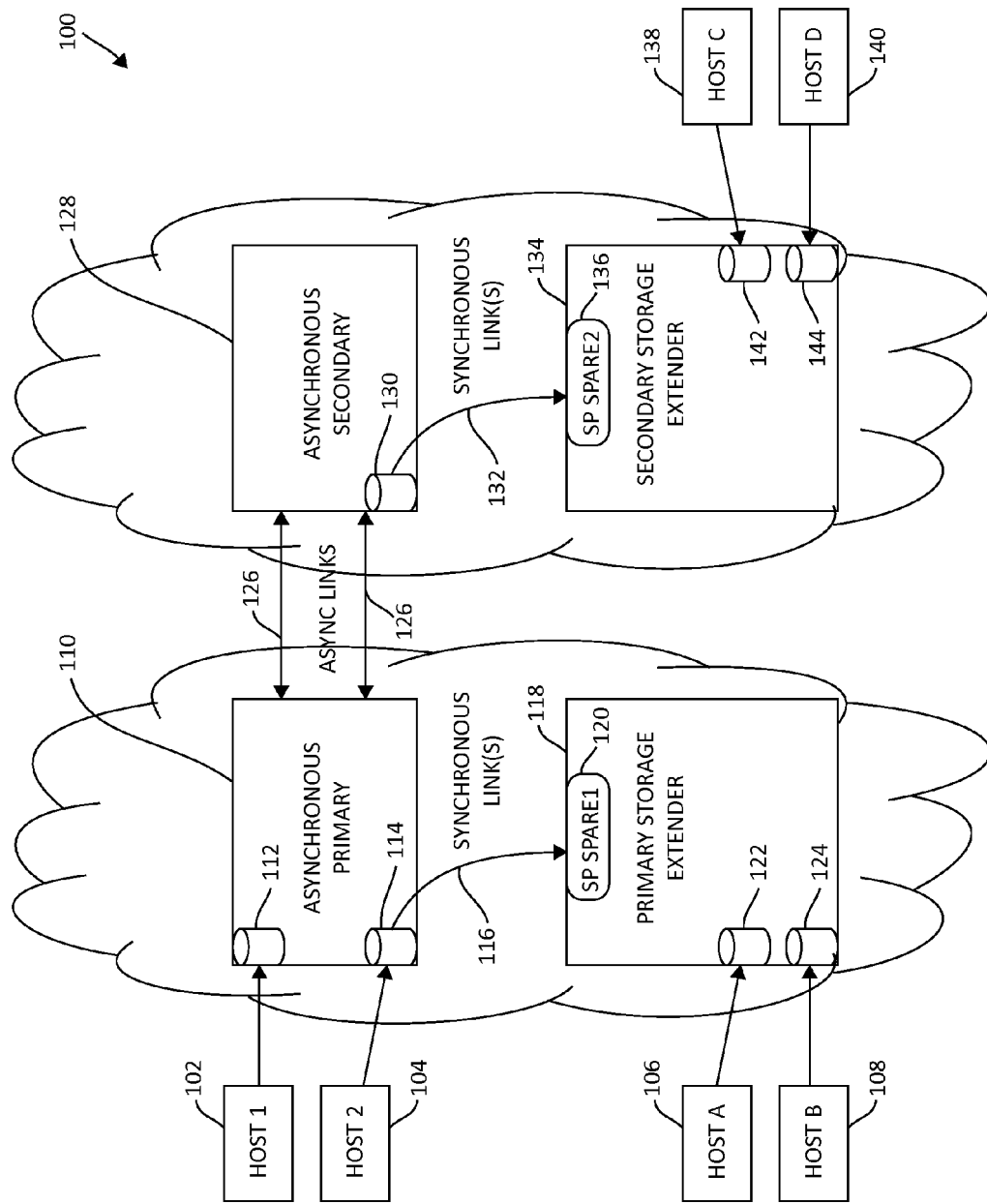
FIG. 3 is a block diagram of exemplary interconnection relationships between primary and secondary storage pools and associated primary and secondary extender storage pools, again in which various aspects of the present invention may be implemented.

FIG. 3, following, illustrates exemplary communication links between host systems, primary storage pool systems and extender storage pool systems in an additional embodiment as configuration 100. Configuration 100 includes several hosts 102, 104, 106, 108, 138, and 140 as shown. Each of the hosts 102, 104, 106, 108, 138, and 140 are connected to a host volume 112, 114, 122, 124, and 142 and 144, respectively. In the asynchronous primary storage system 110, the host volume 114 is connected using a synchronous link 116 to storage pool spare 120 in the primary storage extender system 118.

As shown, various asynchronous communication links 126 connect the asynchronous primary storage system 110 to the asynchronous secondary storage system 128, and to secondary volume 130, which is in turn connected by a synchronous link 132 to storage pool spare 136 in the secondary storage extender system 134.

As previously mentioned, in one of the illustrated embodiments, a source system allocates a most recent snapshot when the time to synch up the source and primary volumes arrives. The most recent snapshot is created on the storage pool of the source volume. If the source system detects that the storage pool is out of space to create the most recent snapshot, the source system may, in one embodiment, create the most recent snapshot in cache. Under this scenario, the source system performs a comparison of the most recent snapshot in cache and the applicable last replicated snapshot. The source system uses the difference in snapshots to determine which data was modified since the last interval.

After the data is sent to the target system, the source system deletes its copy of the last replicated snapshot located either in cache or its storage pool, and renames the most recent snapshot to last replicated snapshot. At the same time the source system sends the most recent snapshot to its local extender storage pool system, the local extender storage pool system deletes its copy of the last replicated snapshot, if one is found, and saves the most recent snapshot received from the source system in the source extended pool as the last replicated snapshot. At the end of this activity, the source system has a copy of the last replicated snapshot in cache, and the source local extender storage pool system contains the last replicated snapshot in the storage pool extender.

Figure 4:
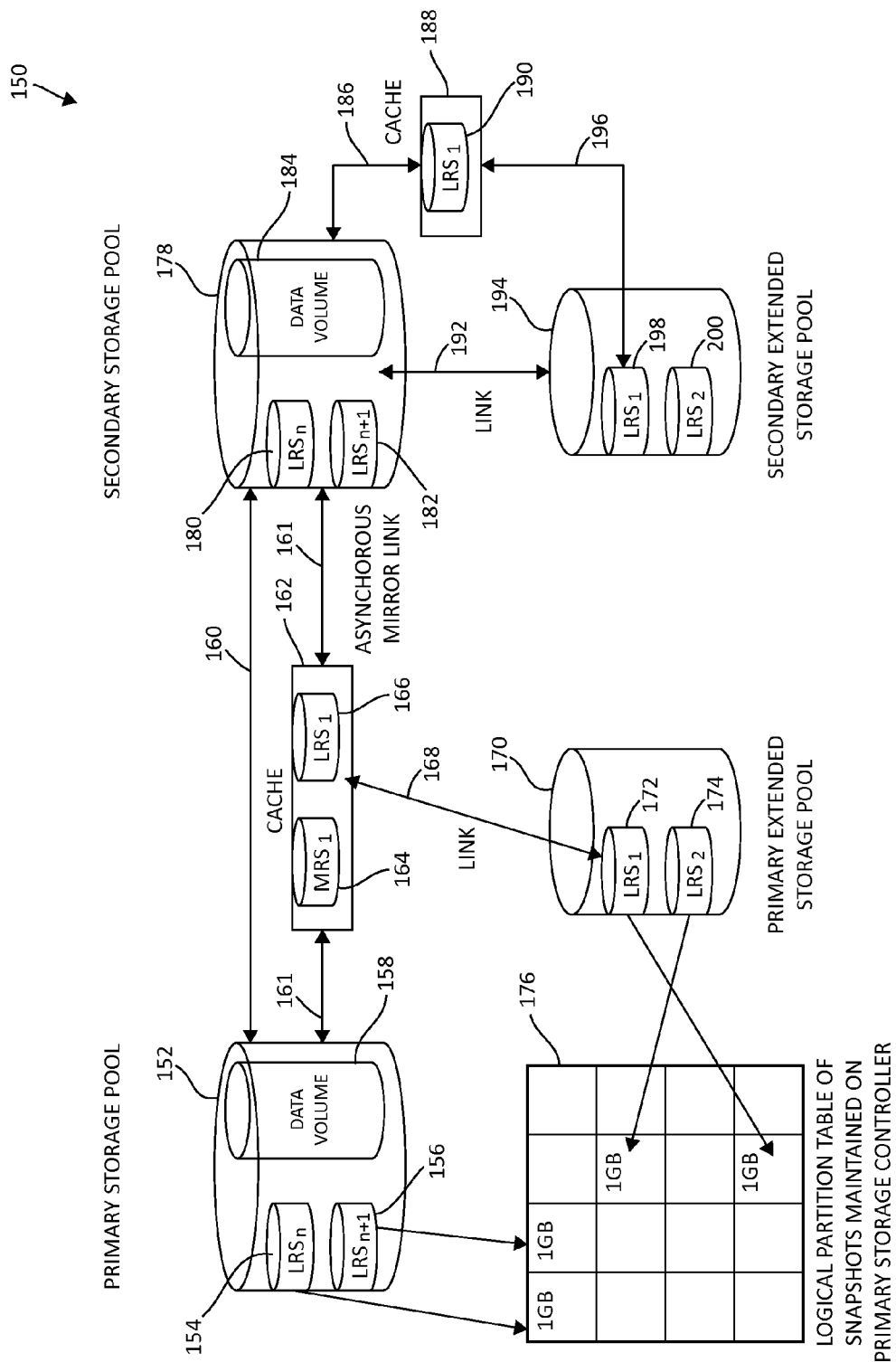
FIG. 4 is a block diagram again illustrating primary and secondary storage pools, and further depicting storage of various data structures contemplated by the present invention in cache.

The scenario described above is illustrated further in FIG. 4, following, where in configuration 150, the primary storage pool 152 is in communication via link (e.g., asynchronous mirror link) to secondary storage pool 178. Again as shown, the primary storage pool includes last replicated snapshots (LRS) 154 and 156, as well as data volume 158, which are connected to cache 162 via link 161. Cache 162 includes a most recent snapshot (MRS) 164, which has been created due to the scenario previously described, as well as LRS 166. Cache 162, in turn is connected over link 168 (e.g., synchronous link) to primary extended storage pool 170, including LRS 172 and 174 as shown. In the depicted embodiment, LRS 154 and 156, as well as 172 and 174 are mapped to a logical partition table 176 of snapshots maintained on the primary storage controller. As shown, each of these snapshots is 1 GB in size.

Secondary storage pool 178, like primary storage pool 152, includes a replicated data volume 184 of data volume 158, as well as LRS 180 and 182 corresponding to LRS 154 and 156, and is connected to the cache 162 of the primary storage system via connection 161 (which again may be an asynchronous mirror link connection). The secondary storage system includes its own cache 188, which is connected to the secondary storage pool 178 via link 186. The cache 188 includes the LRS 190, corresponding to LRS 166 in the cache 162. The secondary extended storage pool 194 includes LRS 198 and LRS 200, again corresponding to LRS 172 and 174 in the primary extended storage pool 170. The secondary extended storage pool 194 is connected to the cache 188 via link 196. Here again, links 192 and 196 may be synchronous mirror link connections as previously described.

As mentioned previously, in one embodiment, a target system allocates a last replicated snapshot after it has acknowledged to the source system the reception of the data, and the data saved in the target volume. If the target system detects that its storage pool is out of space to create the last replicated snapshot, the target system may in one embodiment create the last replicated snapshot in cache. Under this scenario, the target system deletes its copy of the last replicated snapshot. At the same time the last replicated snapshot is sent to the local extender storage pool system, the local extender storage pool system deletes its copy of the last replicated snapshot, if one is available, and then will save the last replicated snapshot it received from the target system.

In one embodiment, in the event that the user has increased the storage pool of the system that is using a local storage extender system, the system sends a request to its local extender storage pool system to get the last replicated snapshot. Once the system has stored the last replicated snapshot in its storage pool, it sends a notification to its local extender storage pool system to delete its copy of the last replicated snapshot.

Again, in one embodiment, in the event of a disaster recovery, and the secondary has its last replicated snapshot in its local extender storage pool system, the secondary system will retrieve the last replicated snapshot from its local extender pool system, and it stores the last replicated snapshot in cache. Thus, when recovery is invoked, the secondary system will immediately have access to the last replicated snapshot. Such a scenario is also applicable in the event of a planned or unplanned site switch.

Turning now to FIGS. 5 and 6, exemplary methods 210 and 300 for facilitating data storage using an extender storage pool system is illustrated. In one embodiment, methods 210 and 300 may be implemented using various hardware components previously illustrated (e.g., FIG. 1, previously), or various other processing, networking, and storage components in computing environments. As one skilled in the art will appreciate, various steps in the methods 210 and 300 may be implemented in differing ways to suit a particular application. In addition, the described methods 210 and 300 may be implemented by various means, such as hardware, software, firmware, or a combination thereof operational on or otherwise associated with the computing environment. For example, the methods 210 and 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Turning first to FIG. 5, method 210 describes a scenario where a source storage system has reduced or no space for a particular data snapshot. Method 210 is organized in terms of activities of the host, source, and target systems respectively as shown. In a first step, the user interface is utilized (again CLI or GUI) to create a storage pool (step 212) on the source system. On the target system, the user interface is also used to create a corresponding storage pool (step 214).

As a following step, a section of the pool of the source and target system is assigned for data snapshots (steps 216 and 218). Several logical unit names (LUNs) are created in the storage pool (steps 220 and 222). Next, the user interface is used to create the extender storage pool in the extender storage system (again, both source and target systems) (steps 224 and 226).

An asynchronous mirror pair is then created by the source system (step 228). An asynchronous relationship is created (step 230) between source and target volumes. A new most recent snapshot of the source volume is created, which will serve as a baseline, is created in the source storage pool (step 232). At this point, the host executes a write input/output (I/O) operation, and in a sync job, sends the source volume data to the target (step 234). The sync job completes the transfer (step 236), and the most recent snapshot (MRS) is renamed as the last replicated snapshot (LRS) (step 238), which represents the last point in time for recovery. On the target system, the LRS is created in its storage pool (step 240).

Additional write I/O activity takes place, and the applicable time interval expires (step 242). The source system creates a new MRS in its storage pool (step 244). Pursuant to additional I/O activity, the MRS is compared to the LRS (step 246), and the difference is the new data that needs to be sent to the target system (step 248). Additional I/O activity takes place, and the sync job sends new updates to the target (step 250) and completes the transfer (step 252). The last replicated snapshot is deleted from the source storage pool (step 254) and the target storage pool (step 256), while the MRS is renamed the LRS on the storage pool (step 258), and a new LRS is created on the storage pool in the target system (step 260).

Additional write I/O activity takes place, and the time interval expires (step 262). Due to a lack of storage capacity on the source storage pool for a new snapshot (step 264), the MRS is created in cache (step 266). Additional write I/O takes place, and the MRS in the source system cache is compared to the LRS in the storage pool (step 268), and the difference is the new data that needs to be sent to the target (step 270). Pursuant to additional write I/O, the sync job sends new updates to the target (step 272), and ultimately completes the transfer (step 274). The LRS in the source and target storage pools are deleted (step 276, 278). The MRS is renamed the LRS, and sent to the local storage extender to be saved in the local extender storage pool (step 280), while a new LRS is created in the target storage pool (step 282).

Turning next to FIG. 6, method 300 describes a scenario where a target storage system has reduced or no space for a particular data snapshot. Method 300, like method 210 previously, is organized in terms of activities of the host, source, and target systems respectively as shown. In a first step, the user interface is utilized (again CLI or GUI) to create a storage pool (step 302) on the source system. On the target system, the user interface is also used to create a corresponding storage pool (step 304).

As a following step, a section of the pool of the source and target system is assigned for data snapshots (steps 306 and 308). Several logical unit names (LUNs) are created in the storage pool (steps 310 and 312). Next, the user interface is used to create the extender storage pool in the extender storage system (again, both source and target systems) (steps 314 and 316).

An asynchronous mirror pair is then created by the source system (step 318). An asynchronous relationship is created (step 320) between source and target volumes. A new most recent snapshot of the source volume is created, which will serve as a baseline, is created in the source storage pool (step 322). At this point, the host executes a write input/output (I/O) operation, and in a sync job, sends the source volume data to the target (step 324). The sync job completes the transfer (step 326), and the most recent snapshot (MRS) is renamed as the last replicated snapshot (LRS) (step 328), which represents the last point in time for recovery. On the target system, the LRS is created in its storage pool (step 330).

Additional write I/O activity takes place, and the applicable time interval expires (step 332). The source system creates a new MRS in its storage pool (step 334). Pursuant to additional I/O activity, the MRS is compared to the LRS (step 336), and the difference is the new data that needs to be sent to the target system (step 338). Additional I/O activity takes place, and the sync job sends new updates to the target (step 340) and completes the transfer (step 342). The last replicated snapshot is deleted from the source storage pool (step 344) and the target storage pool (step 346), while the MRS is renamed the LRS on the storage pool (step 348), and a new LRS is created on the storage pool in the target system (step 350).

Additional write I/O activity takes place, and the time interval expires (step 352). The source system creates a new MRS in its storage pool (step 354). Pursuant to additional I/O activity, the MRS is compared to the LRS (step 356), and the difference is the new data that needs to be sent to the target system (step 358). Additional I/O activity takes place, and the sync job sends new updates to the target (step 360) and completes the transfer (step 362). The last replicated snapshot is deleted from the source storage pool (step 364) and the target storage pool (step 368). The MRS is renamed the LRS on the source system (step 366).

On the target system, the new LRS is not created due to a lack of capacity in the storage pool (step 370). Accordingly, the new LRS is alternatively sent to the target local storage extender to be saved in the target local extender storage pool system (step 372).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A method for managing data, by a processor device, in a computing storage environment including a source storage pool storing a first last replicated snapshot (LRS) of the data, a target storage pool coupled to the source storage pool and storing the first LRS, a first extender storage pool system coupled to and configured for expanding an available storage capacity for the target storage pool, and a second extender storage pool system coupled to and configured for expanding an available storage capacity for the source storage pool, the method comprising:
creating a first most recent snapshot (MRS) of the data stored in the source storage pool;
comparing the first MRS and the first LRS in the source storage pool to determine if there is new data in the first MRS that is not in the first LRS;
if the first MRS comprises new data, mirroring the first MRS to the target storage pool;
renaming the first MRS on the target storage pool as a second LRS of the data;
synchronously storing, on the first extender storage pool system, the second LRS;
renaming the first MRS as the second LRS on the source storage pool; and
mirroring, on the second extender storage pool system, the second LRS.

2. The method of claim 1, wherein creating the first MRS comprises creating the MRS in a cache associated with the source storage pool because there is no storage space available in the source storage pool.

3. The method of claim 2, further comprising fetching the second LRS from the first extender storage pool system and storing the second LRS in the cache.

4. The method of claim 3, further comprising:
deleting the first MRS from the cache;
creating a second MRS of the data stored in the source storage pool;
comparing the second MRS and the second LRS in the cache to determine if there is new data in second MRS that is not in the second LRS;
if the second MRS comprises new data, mirroring the second MRS to the target storage pool;
renaming the second MRS on the target storage pool as a third LRS of the data;
synchronously storing, on the first extender storage pool system, the third LRS;
renaming the second MRS as the third LRS on the source storage pool; and
mirroring, on the second extender storage pool system, the third LRS.

5. The method of claim 1, further comprising:
waiting until a predetermined time interval expires if there is no new data in the first MRS that is not in the first LRS; and
deleting the first MRS upon expiration of the predetermined time interval.

6. The method of claim 5, further comprising:
upon expiration of the predetermined time interval, creating a second MRS of the data stored in the source storage pool;
comparing the second MRS and the first LRS in the source storage pool to determine if there is new data in the second MRS that is not in the first LRS;
if the second MRS comprises new data, mirroring the second MRS to the target storage pool;
renaming the second MRS on the target storage pool as a second LRS of the data;
synchronously storing, on the first extender storage pool system, the second LRS;
renaming the second MRS as the second LRS on the source storage pool; and
mirroring, on the second extender storage pool system, the second LRS.

7. The method of claim 1, further comprising deleting a previous LRS in the source storage pool in upon mirroring the first MRS to the target storage pool.

8. A system for managing data in a computing storage environment, comprising:
a processor device, operable in the computing storage environment, wherein the processor device is configured for:

creating a first most recent snapshot (MRS) of the data stored in the source storage pool,
comparing the first MRS and the first LRS in the source storage pool to determine if there is new data in the first MRS that is not in the first LRS,
if the first MRS comprises new data, mirroring the first MRS to the target storage pool,
renaming the first MRS on the target storage pool as a second LRS of the data,
synchronously storing, on the first extender storage pool system, the second LRS,
renaming the first MRS as the second LRS on the source storage pool, and
mirroring, on the second extender storage pool system, the second LRS.

9. The system of claim 8, wherein, when creating the first MRS, the processor device is configured for creating the MRS in a cache associated with the source storage pool because there is no storage space available in the source storage pool.

10. The system of claim 9, wherein the processor device is further configured for fetching the second LRS from the first extender storage pool system and storing the second LRS in the cache.

11. The system of claim 10, wherein the processor device is further configured for:
deleting the first MRS from the cache;
creating a second MRS of the data stored in the source storage pool;
comparing the second MRS and the second LRS in the cache to determine if there is new data in second MRS that is not in the second LRS;
if the second MRS comprises new data, mirroring the second MRS to the target storage pool;
renaming the second MRS on the target storage pool as a third LRS of the data;
synchronously storing, on the first extender storage pool system, the third LRS;
renaming the second MRS as the third LRS on the source storage pool; and
mirroring, on the second extender storage pool system, the third LRS.

12. The system of claim 8, wherein the processor device is further configured for:
waiting until a predetermined time interval expires if there is no new data in the first MRS that is not in the first LRS; and
deleting the first MRS upon expiration of the predetermined time interval.

13. The system of claim 12, wherein the processor device is further configured for:
upon expiration of the predetermined time interval, creating a second MRS of the data stored in the source storage pool;
comparing the second MRS and the first LRS in the source storage pool to determine if there is new data in the second MRS that is not in the first LRS;
if the second MRS comprises new data, mirroring the second MRS to the target storage pool;
renaming the second MRS on the target storage pool as a second LRS of the data;
synchronously storing, on the first extender storage pool system, the second LRS;
renaming the second MRS as the second LRS on the source storage pool; and
mirroring, on the second extender storage pool system, the second LRS.

14. The system of claim 8, wherein the processor device is further configured for deleting a previous LRS in the source storage pool in upon mirroring the first MRS to the target storage pool.

15. A computer program product for managing data, by a processor device, in a computing storage environment including a source storage pool storing a first last replicated snapshot (LRS) of the data, a target storage pool coupled to the source storage pool and storing the first LRS, a first extender storage pool system coupled to and configured for expanding an available storage capacity for the target storage pool, and a second extender storage pool system coupled to and configured for expanding an available storage capacity for the source storage pool, the computer program product comprising a non-transitory computer-readable storage medium including computer-readable program code portions stored therein, the computer program product comprising
computer code for creating a first most recent snapshot (MRS) of the data stored in the source storage pool;
computer code for comparing the first MRS and the first LRS in the source storage pool to determine if there is new data in the first MRS that is not in the first LRS;
computer code for, if the first MRS comprises new data, mirroring the first MRS to the target storage pool;
computer code for renaming the first MRS on the target storage pool as a second LRS of the data;
computer code for synchronously storing, on the first extender storage pool system, the second LRS;
computer code for renaming the first MRS as the second LRS on the source storage pool; and
computer code for mirroring, on the second extender storage pool system, the second LRS.

16. The computer program product of claim 15, wherein the computer code for creating the first MRS comprises computer code for creating the MRS in a cache associated with the source storage pool because there is no storage space available in the source storage pool.

17. The computer program product of claim 16, further comprising computer code for fetching the second LRS from the first extender storage pool system and computer code for storing the second LRS in the cache.

18. The computer program product of claim 17, further comprising:
computer code for deleting the first MRS from the cache;
computer code for creating a second MRS of the data stored in the source storage pool;
computer code for comparing the second MRS and the second LRS in the cache to determine if there is new data in second MRS that is not in the second LRS;
computer code for, if the second MRS comprises new data, mirroring the second MRS to the target storage pool;
computer code for renaming the second MRS on the target storage pool as a third LRS of the data;
computer code for synchronously storing, on the first extender storage pool system, the third LRS;
computer code for renaming the second MRS as the third LRS on the source storage pool; and
computer code for mirroring, on the second extender storage pool system, the third LRS.

19. The computer program product of claim 15, further comprising:
computer code for waiting until a predetermined time interval expires if there is no new data in the first MRS that is not in the first LRS;
computer code for, upon expiration of the predetermined time interval, deleting the first MRS and creating a second MRS of the data stored in the source storage pool;

computer code for comparing the second MRS and the first LRS in the source storage pool to determine if there is new data in the second MRS that is not in the first LRS;

computer code for, if the second MRS comprises new data, mirroring the second MRS to the target storage pool;

computer code for renaming the second MRS on the target storage pool as a second LRS of the data;

computer code for synchronously storing, on the first extender storage pool system, the second LRS;

computer code for renaming the second MRS as the second LRS on the source storage pool; and computer code for mirroring, on the second extender storage pool system, the second LRS.

20. The computer program product of claim 15, further comprising computer code for deleting a previous LRS in the source storage pool in upon mirroring the first MRS to the target storage pool.

* * * * *